(No Model.)

S. E. CHAMBERLAIN.
END GATE FOR VEHICLES.

No. 299,907. Patented June 3, 1884.

Witnesses:
J. A. Pinkston
E. H. Phelps

Inventor.
Simon E. Chamberlain

UNITED STATES PATENT OFFICE.

SIMEON E. CHAMBERLAIN, OF KANSAS CITY, MISSOURI.

END-GATE FOR VEHICLES.

SPECIFICATION forming part of Letters Patent No. 299,907, dated June 3, 1884.

Application filed October 5, 1883. (No model.)

*To all whom it may concern:*

Be it known that I, SIMEON ELWOOD CHAMBERLAIN, a citizen of the United States, and a resident of Kansas City, in the county of Jackson and State of Missouri, have invented a new and useful Improvement in Locking Devices for the End-Gates to Vehicles; and I do hereby declare that the following is a full, clear, and exact description of the invention, which will enable others skilled in the art to which it appertains to make and use the same, reference being had to the accompanying drawings, forming part of this specification.

My invention has for its object a novel device for securing the end-gate to a vehicle, which can be operated expeditiously and afford a convenient means for withdrawing and replacing the end-gate without injury to the body, and without entailing loss of parts; and it consists in the novel construction and combination of parts hereinafter fully described, and specifically pointed out in the claims.

Figure 1:
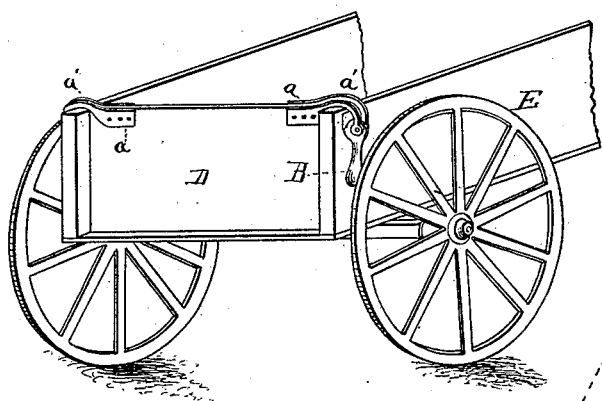
Figure 3:
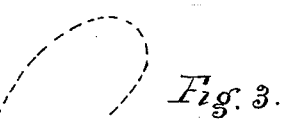
Figure 2:
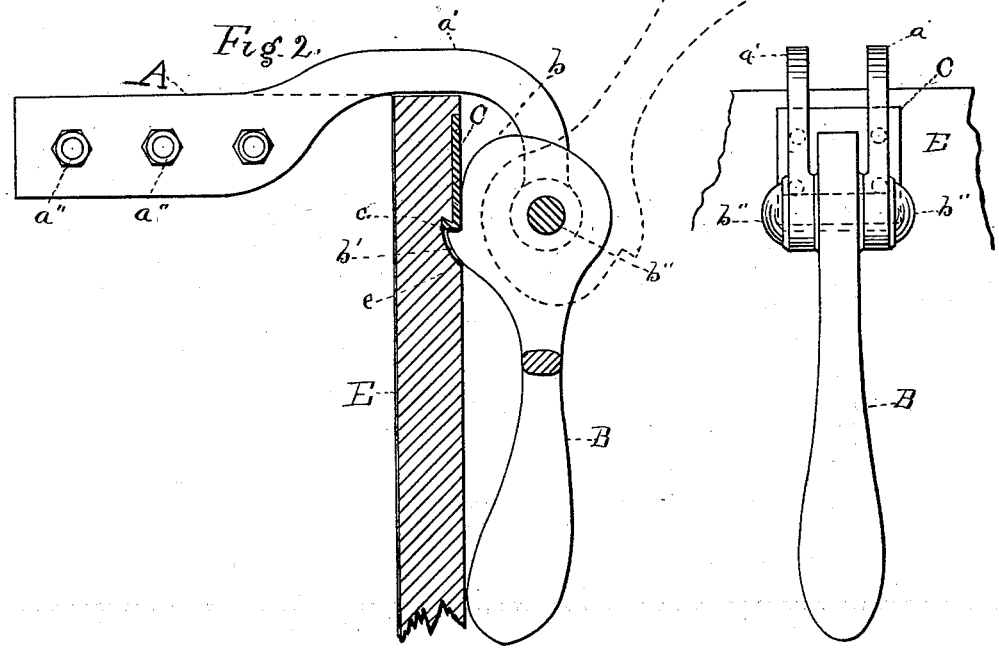
Figure 4:
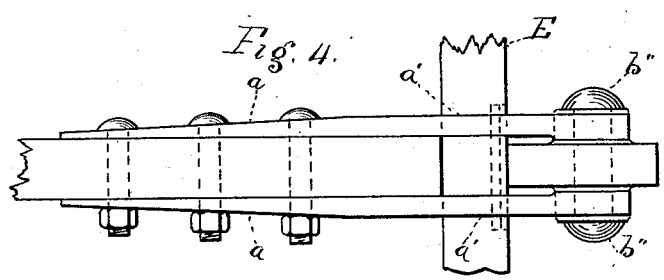

In the drawings, Figure 1 is an isometrical view of a vehicle, showing my device applied thereto. Fig. 2 is a side view of the device and the means for operating the same. Fig. 3 is an end view of the device from the outer side of the body of the vehicle. Fig. 4 is a plan view of Fig. 2.

A represents a bar having the divisions $a\ a$ and curved arm $a'$. B is a lever having the eccentric portions $b$ and lip $b'$. $b''$ is a bolt securing lever B to bar A. C is a catch-plate. D is the end-gate to a vehicle, and E the sides to the same.

In the construction of my invention, I make a lever, B, of suitable length, and form upon one end an eccentric, $b$, and a lip, $b'$, projecting beyond the curve of the eccentric and between the same and the free end of the lever. A perforation is then made transversely through the end of the lever, in rear of the eccentric $b$. I then form a bar, A, preferably in two portions, $a\ a$, each portion being of sufficient length to be attached in one direction upon the inner and outer sides of an end-gate of a vehicle, to which it is secured by the bolts $a''\ a''$. Upon the opposite portions of the bar A, I make the curved arms $a'\ a'$ in such shape as to extend over the sides of the body, and afford a means for obtaining a proper leverage, and then perforate the same transversely at their extremities, and attach the perforated end of the lever B thereto. Said portion of the lever, which is made of a proportionate width to the space between the portions $a\ a$ of the bar, is inserted therein, with the eccentric $b$ and its lip $b'$ in the direction of said bars, and relatively to the sides of the vehicle when attached thereto. The bolt $b''$ is then inserted in the perforations through the lever B and the divisions $a\ a$ of bar A, securely uniting them, and at the same time permitting a free play of the lever. The divisions of the bar A are then attached to the end-gate D, nearly in line with the top, the curved arms $a'\ a'$ extending over the sides of the vehicle, and the bolts $a''\ a''$ passing transversely through the said bar and the end-gate. A catch-plate, C, with an offset, $c$, below, is then secured to the side of the body of the vehicle, opposite to that portion of the lever having the eccentric $b'$, by screws or other suitable means, a depression, $e$, being made in the sides of the body to admit the offset $c$ and afford room for the entrance of lip $b'$.

In the operation of my device the free ends of lever B, which afford a convenient means for raising or lowering the end-gate, are raised in a vertical plane until the said gate is closed in place to the sides of the body of the vehicle, when they are lowered below the plane of the bar A, and the eccentric $b$, coming in contact with plate C upon the sides of the body, first draws the end-gate and sides closely together; then, upon closing the end of the lever hard against the sides of the body, the lip $b'$ enters the depression $e$ in the side of the body, and is fastened by the offset $c$ on plate C, thereby preventing any movement of the end-gate until the lever is released.

It is clearly perceived that the bar A may be made in one piece and bolted to either side of the end-gate, and that the lever may be pivotally attached to the side of one arm of the bar with equal facility. The length of bar A may be uniform; but in attaching the same to the end-gate the lip upon the lever should be carried within the recess $e$ of the sides and against the offset $c$ of plate C, thereby locking the same, and enabling the compression of the eccentric on plate C and a diminishing portion thereof at the same time (when the free end of the lever is against the side of the body E) to bear eccentrically to the pivotal point of the lever against the plate C. By this means the upward tendency of the end-gate in the jolting of the vehicle binds the free end of the lever more firmly against the side of the body. The depression $e$ in the side of the body E affords a diminution in the length of the arm $a'$ and a secure fastening to a sliding end-gate. The plate C, however, may be reversed, with the offset $c$ projecting outwardly, if desired, especially when the end-gate is held in suitable grooves in the side of the body E. The offset $c$ prevents the wear of the wood above the depression $e$, and relieves the strain upon the bolts or screws by which it is attached to the side E of the body. When an end-gate is hinged to the body of a vehicle, the bar A is attached to the sides, and with the use of but one bolt, thus permitting the raising of the arm in avoidance of the end-gate.

In constructing the bar A with the curved arms $a'$ $a'$, I am enabled to combine said bar, having the eccentric pivoted thereto, fixedly with the end-gate or sides of the vehicle, and in so doing obtain the proportionate degree of leverage required to close the said sides and end-gate below the point of attachment of the bar A to the vehicle in the simplest and most expeditious manner.

My device is readily applied, it retains the sides and end-gate uniformly together, and affords a protection from the strain produced by the motion of the vehicle.

Having fully described my invention, what I now claim as new, and desire to secure by Letters Patent, is—

1. A locking device for the end-gate to a vehicle, consisting of a bar one end of which is adapted to be attached fixedly to the end-gate and its opposite end constructed with a curved arm, and an eccentric provided with a suitable lever pivotally attached to said curved arm below the point of attachment of the said bar to the vehicle, as and for the purpose specified.

2. The combination, in a locking device for the end-gate to a vehicle, of a bar one end of which is adapted to be attached fixedly to the end-gate and its opposite end constructed with a curved arm, and an eccentric provided with a suitable lever pivotally attached to said curved arm below the point of attachment of the said bar to the vehicle, and a lip projecting beyond the curve of the eccentric, and between the same and the free end of the lever, which is adapted to engage with an offset on the side of the vehicle and lock the lever, in the manner shown and specified.

3. The combination, with the bar having an extended arm and adapted to be secured to the end-gate of a vehicle, and a lever one end of which is provided with an eccentric and pivotally attached to said arm, of a catch-plate having a suitable offset which is adapted to be attached to the side of the body of the vehicle, as and for the purpose specified.

In testimony whereof I have hereunto set my hand in the presence of two witnesses.

SIMEON E. CHAMBERLAIN.

Witnesses:
J. A. PINKSTON,
E. H. PHELPS.